(12) United States Patent
Hoke et al.

(10) Patent No.: US 9,321,042 B2
(45) Date of Patent: Apr. 26, 2016

(54) CATALYST COMPOSITIONS, CATALYTIC ARTICLES, SYSTEMS AND PROCESSES USING LARGE PARTICLE MOLECULAR SIEVES

(71) Applicant: BASF Corporation, Florham Park, NJ (US)

(72) Inventors: Jeffrey B. Hoke, North Brunswick, NJ (US); Ahmad Moini, Princeton, NJ (US); Marcus Hilgendorff, Hannover Bemerode (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/104,716

(22) Filed: Dec. 12, 2013

(65) Prior Publication Data
US 2014/0170043 A1 Jun. 19, 2014

Related U.S. Application Data

(60) Provisional application No. 61/736,387, filed on Dec. 12, 2012.

(51) Int. Cl.
*B01D 53/34* (2006.01)
*B01D 53/56* (2006.01)
(Continued)

(52) U.S. Cl.
CPC .......... *B01J 29/7415* (2013.01); *B01D 53/00* (2013.01); *B01D 53/944* (2013.01); *B01D 53/945* (2013.01); *B01J 23/42* (2013.01); *B01J 23/44* (2013.01); *B01J 29/7007* (2013.01); *B01J 35/023* (2013.01); *B01J 35/04* (2013.01);
(Continued)

(58) Field of Classification Search
CPC .......... B01J 29/068; B01J 29/08; B01J 29/44; B01J 29/74; B01J 23/40; B01J 23/42; B01J 23/44; B01J 23/56; B01D 53/945; F01N 3/2846; F01N 2330/08
USPC ..... 502/66, 74, 261, 262, 326, 327, 502/332–334, 339, 439; 423/213.5; 422/181
See application file for complete search history.

(56) References Cited

U.S. PATENT DOCUMENTS 4,843,052 A * 6/1989 Lussier ........................ 502/68
5,108,969 A * 4/1992 Del Rossi et al. ............... 502/66
(Continued)

FOREIGN PATENT DOCUMENTS

CN 1179463 4/1998
CN 101530787 9/2009
(Continued)

OTHER PUBLICATIONS

Non-Final Office Action in U.S. Appl. No. 14/104,731, dated Jul. 25, 2014, 10 pages.
(Continued)

*Primary Examiner* — Cam N. Nguyen
(74) *Attorney, Agent, or Firm* — Womble Carlyle Sandridge & Rice, LLP (57) ABSTRACT

Described are catalyst compositions, catalytic articles, methods of manufacturing catalytic articles and exhaust gas treatment systems and methods that utilize the catalytic articles. The catalytic articles include a washcoat of platinum group metal on refractory oxide support particles, and further including a molecular sieve wherein greater than 90% of the molecular sieve particles have a particle size greater than 1 μm.

45 Claims, 7 Drawing Sheets

(51) Int. Cl.
| | |
|---|---|
| B01D 53/94 | (2006.01) |
| B01D 50/00 | (2006.01) |
| B01J 8/02 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |
| C01G 28/00 | (2006.01) |
| C01G 30/00 | (2006.01) |
| B01J 29/00 | (2006.01) |
| B01J 29/06 | (2006.01) |
| B01J 21/00 | (2006.01) |
| B01J 21/04 | (2006.01) |
| B01J 23/02 | (2006.01) |
| B01J 23/40 | (2006.01) |
| B01J 23/42 | (2006.01) |
| B01J 23/44 | (2006.01) |
| B01J 23/56 | (2006.01) |
| B01J 29/74 | (2006.01) |
| F01N 3/28 | (2006.01) |
| B01J 37/02 | (2006.01) |
| B01J 37/03 | (2006.01) |
| B01J 29/70 | (2006.01) |
| B01J 35/02 | (2006.01) |
| B01J 35/04 | (2006.01) |
| B01J 35/08 | (2006.01) |
| B01J 35/10 | (2006.01) |
| B01D 53/00 | (2006.01) |

(52) U.S. Cl.
CPC .............. *B01J35/08* (2013.01); *B01J 35/1019* (2013.01); *B01J 37/0215* (2013.01); *B01J 37/0244* (2013.01); *B01J 37/0246* (2013.01); *B01J 37/0248* (2013.01); *B01J 37/038* (2013.01); *F01N 3/28* (2013.01); *B01D 2255/1021* (2013.01); *B01D 2255/1023* (2013.01); *B01D 2255/50* (2013.01); *B01D 2255/502* (2013.01); *B01D 2255/504* (2013.01); *B01D 2255/9202* (2013.01); *Y02T 10/22* (2013.01)

(56) References Cited

U.S. PATENT DOCUMENTS

| | | | |
|---|---|---|---|
| 5,371,312 A | 12/1994 | Lago et al. | |
| 5,897,846 A | 4/1999 | Kharas et al. | |
| 6,528,031 B1 * | 3/2003 | Park et al. | 423/239.2 |
| 6,641,788 B1 | 11/2003 | Ogawa et al. | |
| 6,902,664 B2 * | 6/2005 | Timken | 208/111.01 |
| 7,271,123 B2 * | 9/2007 | Chang et al. | 502/214 |
| 7,763,560 B2 | 7/2010 | Horiuchi et al. | |
| 7,790,127 B1 | 9/2010 | Lee et al. | |
| 7,824,639 B2 | 11/2010 | Moroz et al. | |
| 7,981,834 B2 | 7/2011 | Goto et al. | |
| 8,741,800 B2 | 6/2014 | Elam et al. | |
| 2001/0053745 A1 | 12/2001 | Kharas et al. | |
| 2002/0192515 A1 | 12/2002 | Bachinger et al. | |
| 2003/0018228 A1 * | 1/2003 | Vaughn et al. | 585/500 |
| 2004/0064008 A1 * | 4/2004 | Maurer et al. | 585/640 |
| 2004/0092385 A1 * | 5/2004 | Timken | 502/64 |
| 2006/0224032 A1 * | 10/2006 | Janssen | 585/639 |
| 2009/0143221 A1 | 6/2009 | Ogunwumi et al. | |
| 2009/0155525 A1 | 6/2009 | Li | |
| 2010/0092358 A1 | 4/2010 | Koegel et al. | |
| 2010/0183490 A1 | 7/2010 | Hoke et al. | |
| 2010/0189615 A1 | 7/2010 | Gramiccioni | |
| 2010/0303677 A1 | 12/2010 | Henry et al. | |
| 2010/0316547 A1 | 12/2010 | Justice et al. | |
| 2011/0005211 A1 | 1/2011 | Tissler et al. | |
| 2011/0014099 A1 | 1/2011 | Dornhaus et al. | |
| 2011/0044871 A1 | 2/2011 | Maletz et al. | |
| 2012/0020875 A1 | 1/2012 | Matsuo et al. | |
| 2012/0079817 A1 * | 4/2012 | Wei et al. | 60/299 |
| 2012/0213674 A1 | 8/2012 | Schuetze et al. | |
| 2013/0029832 A1 * | 1/2013 | Lai et al. | 502/73 |
| 2013/0202509 A1 | 8/2013 | Schuetze et al. | |

FOREIGN PATENT DOCUMENTS

| | | |
|---|---|---|
| DE | 102009053919 | 5/2011 |
| EP | 0248147 | 12/1987 |
| EP | 0645185 | 3/1995 |
| EP | 1839747 A2 | 10/2007 |
| EP | 2275194 | 1/2011 |
| EP | 2380663 A1 | 10/2011 |
| JP | 2002177788 | 6/2002 |
| JP | 2002273232 | 9/2002 |
| KR | 20090023786 | 3/2009 |
| WO | WO-97/00119 | 1/1997 |
| WO | WO-2007/093325 | 8/2007 |
| WO | WO-2007/107371 | 9/2007 |
| WO | WO-2009/022967 | 2/2008 |
| WO | WO-2009/049795 | 4/2009 |
| WO | WO-2009/118188 | 10/2009 |
| WO | WO-2009/120866 | 10/2009 |
| WO | WO-2010/083313 | 7/2010 |
| WO | WO-2010/083315 | 7/2010 |
| WO | WO-2010/083357 | 7/2010 |
| WO | WO-2011/057649 | 5/2011 |
| WO | WO-2011/082357 | 7/2011 |
| WO | WO-2012/055730 | 5/2012 |
| WO | WO-2012/059144 | 5/2012 |
| WO | WO-2012/059145 | 5/2012 |

OTHER PUBLICATIONS

International Search Report dated Apr. 11, 2014.
Weuster-Botz, D. et al., "Scale-up and application of a cyclone reactor for fermentation processes", *Bioprocesses Engineering* 18 1998, 433-438.
PCT International Preliminary Report on Patentability in PCT/US2013/074750, dated Jun. 16, 2015, 7 pages.

* cited by examiner

CATALYST COMPOSITIONS, CATALYTIC ARTICLES, SYSTEMS AND PROCESSES USING LARGE PARTICLE MOLECULAR SIEVES

CROSS-REFERENCE TO RELATED APPLICATIONS

This application claims priority under 35 USC §119(e) to U.S. Provisional Application No. 61/736,387, filed Dec. 12, 2012, the entire contents of which are is incorporated herein by reference.

TECHNICAL FIELD

The present invention pertains to the field of catalyst compositions and catalytic articles for the abatement of pollutants from the exhaust gas of internal combustion engines. Specific embodiments are directed to catalytic articles utilized for lean burn engines including a large particle size molecular sieve and a platinum group metal, wherein the molecular sieve has minimized negative interaction with the platinum group metal.

BACKGROUND

Operation of lean burn engines, e.g., diesel engines and lean burn gasoline engines, provide the user with excellent fuel economy, due to their operation at high air/fuel ratios under fuel lean conditions. Diesel engines, in particular, also offer significant advantages over gasoline engines in terms of their fuel economy, durability, and their ability to generate high torque at low speed.

From the standpoint of emissions, however, diesel engines present problems more severe than their spark-ignition counterparts. Emission problems relate to particulate matter (PM), nitrogen oxides (NOx), unburned hydrocarbons (HC) and carbon monoxide (CO). NOx is a term used to describe various chemical species of nitrogen oxides, including nitrogen monoxide (NO) and nitrogen dioxide ($NO_2$), among others.

Oxidation catalysts comprising a platinum group metal dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters, which are placed in the exhaust flow path from a Diesel-powered engine to treat the exhaust before it vents to the atmosphere. Typically, the diesel oxidation catalysts are formed on ceramic or metallic substrates (such as the flow-through monolith carrier) upon which one or more catalyst coating compositions are deposited. In addition to the conversions of gaseous HC, CO and the SOF (Soluble Organic Fraction) of particulate matter, oxidation catalysts that contain platinum group metals (which are typically dispersed on a refractory oxide support) promote the oxidation of nitric oxide (NO) to $NO_2$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, an adsorbent material, which may be a molecular sieve, for example, a zeolite, may be provided as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

One effective method to reduce $NO_x$ from the exhaust of lean-burn engines, such as gasoline direct injection and partial lean-burn engines, as well as from diesel engines, requires trapping and storing of $NO_x$ under lean burn engine operating conditions and reducing the trapped $NO_x$ under stoichiometric or rich engine operating conditions or lean engine operating with external fuel injected in the exhaust to induce rich conditions. The lean operating cycle is typically between 1 minute and 20 minutes and the rich operating cycle is typically short (1 to 10 seconds) to preserve as much fuel as possible. To enhance $NO_x$ conversion efficiency, the short and frequent regeneration is favored over long but less frequent regeneration. Thus, a lean $NO_x$ trap catalyst generally must provide a $NO_x$ trapping function and a three-way conversion function.

Some lean $NO_x$ trap (LNT) systems contain alkaline earth elements. For example, $NO_x$ sorbent components include alkaline earth metal oxides, such as oxides of Mg, Ca, Sr and Ba. Other lean LNT systems can contain rare earth metal oxides such as oxides of Ce, La, Pr and Nd. The $NO_x$ sorbents can be used in combination with platinum group metal catalysts such as platinum dispersed on an alumina support in the purification of exhaust gas from an internal combustion engine.

A conventional LNT typically contains basic sorbent components (e.g., $BaO/BaCO_3$ and/or $CeO_2$) for $NO_x$ storage and platinum group metals (PGM, i.e., Pt, Pd and Rh) for catalytic $NO_x$ oxidation and reduction. The LNT catalyst operates under cyclic lean (trapping mode) and rich (regeneration mode) exhaust conditions during which the engine out NO is converted to $N_2$ as shown in equations 1-6:

$$\text{Lean condition: } 2NO+O_2 \rightarrow 2NO_2 \tag{1}$$

$$\text{(Trapping mode) } 4NO_2+2MCO_3+O_2 \rightarrow 2M(NO_3)_2+2CO_2 \tag{2}$$

$$\text{Rich condition: } M(NO_3)_2+2CO \rightarrow MCO_3+NO_2+NO+CO_2 \tag{3}$$

$$\text{(Regeneration mode) } NO_2+CO \rightarrow NO+CO_2 \tag{4}$$

$$2NO+2CO \rightarrow N_2+2CO_2 \tag{5}$$

$$2NO+2H_2 \rightarrow N_2+2H_2O \tag{6}$$

Molecular sieves such as zeolites are used in diesel oxidation catalyst (DOC) and, as noted above, in Lean $NO_x$ Trap (LNT) applications for the purpose of adsorbing hydrocarbons (HC) from the engine exhaust during startup of the vehicle when the catalyst is cold and unable to oxidize the hydrocarbons to $CO_2$ (cold start). When the temperature of the exhaust increases to the point when the platinum group metal in the catalyst becomes active, hydrocarbon is released from the molecular sieve and is subsequently oxidized to $CO_2$. There are numerous strategies and methods for combining zeolite and platinum group metal in a DOC or LNT catalyst formulation. For instance, molecular sieve can be combined in the same layer as the platinum group metal or separated into different layers. For DOC applications, Pt and Pd are frequently used platinum group metals for oxidation of carbon monoxide (CO) and hydrocarbons (HC) present in diesel engine exhaust. The choice of these active metals is due to a combination of performance (i.e. mixtures of Pt and Pd have improved performance when compared to Pt and Pd alone) and cost (i.e. the price of Pd is significantly less than that of Pt). A frequently used zeolite in diesel applications for HC adsorption is Beta zeolite due to its high capacity for storage of hydrocarbons typically found in diesel exhaust. However, when beta zeolite available from most commercial suppliers is combined with Pt/Pd DOC catalyst in the same slurry and coating layer, CO oxidation performance of the catalyst is reduced significantly compared to that of Pt/Pd DOC catalyst without zeolite addition. Although HC performance is improved due to the HC storage function of the zeolite, the CO performance is reduced due to a negative interaction between the Pt/Pd/alumina catalyst and zeolite. One method to avoid this negative interaction is to separate the Pt/Pd and zeolite into different coating layers. However, it is desirable for simplicity of slurry preparation and monolith coating to combine the Pt/Pd and zeolite in a single slurry and/or coating layer. In order to accomplish this, a new method for overcoming the negative interaction between Pt/Pd and zeolite on CO oxidation performance must be found.

SUMMARY

A first aspect of the present invention pertains to a catalyst composition. Various embodiments are discussed below. Embodiment one pertains to catalyst composition comprising molecular sieve particles and further comprising a platinum group metal supported on a refractory metal oxide support, wherein greater than 90% of the molecular sieve particles have a particle size greater than 1 μm and a $d_{50}$ less than 50 microns. Embodiment two pertains to a variation of embodiment one, in which a portion of the platinum group metal is supported on the molecular sieve particles. Embodiment three is directed to a modification of embodiments one or two, wherein greater than 95% of the molecular sieve particles have a particle size greater than 1 μm.

Embodiment four is directed to a modification of embodiments one through three, wherein greater than 96% of the molecular sieve particles have a particle size greater than 1 μm. Embodiment five is a modification of embodiments one through four, wherein the molecular sieve particles are spray dried particles mixed with binder. Embodiment six is a modification of embodiments one through five, wherein the platinum group metal comprises platinum and palladium. Embodiment seven is a modification of embodiments one through six, wherein greater than 90% of the molecular sieve particles comprise primary crystals with sizes greater than 1 μm. Embodiment eight is a modification of embodiments one through seven, wherein the molecular sieve particles are agglomerates of primary crystals that maintain physical integrity and remain agglomerated during normal oxidation catalyst slurry preparation. Embodiment nine is a modification of embodiments one through eight, wherein the molecular sieve particle component comprises about 96% particles greater than 1 μm and about 95% of particles greater than 2 μm.

Embodiment ten is a modification of embodiments one through nine, wherein the molecular sieve particle component comprises 96% particles in the range of about 1 μm to 10 μm. Embodiment eleven is a modification of embodiments one through ten, further comprising a binder holding the crystallites together.

Embodiment twelve is a modification of embodiments one through eleven, wherein the molecular sieve particles are zeolites selected from the group consisting of faujasite, chabazite, clinoptilolite, mordenite, silicalite, zeolite X, zeolite Y, ultrastable zeolite Y, ZSM-5, ZSM-12, SSZ-13, SAPO-5, SAPO-37, offretite, Beta zeolite and combinations thereof.

Embodiment thirteen is a modification of embodiments one through twelve, wherein the zeolite is H-Beta. Embodiment fourteen is a modification of embodiments one through thirteen, wherein the zeolite has a particle size distribution that is monomodal.

Embodiment fifteen pertains to a catalytic article for the treatment of exhaust gas from lean burn internal combustion engine containing hydrocarbons, carbon monoxide and nitrogen oxides comprising a carrier substrate having a length, an inlet end and an outlet end, an oxidation catalyst material on the carrier, the oxidation catalyst material including the washcoat of any embodiments 1-14. Embodiment sixteen is a modification of embodiment fifteen, wherein the catalytic article utilizes a single washcoat layer. Embodiment seventeen pertains to a modification of embodiments 15 or 16, wherein the article is a LNT. Embodiment eighteen pertains to a modification of embodiments 15 or 16, wherein the article is a DOC. Embodiment nineteen pertains to a modification of embodiments 15 or 16, wherein the article is a CSF. Embodiment twenty comprises a method of treating exhaust gas from a lean burn engine containing hydrocarbons, carbon monoxide and nitrogen oxides comprising flowing the exhaust gas over a catalytic article in accordance with embodiments 15 through 19.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Embodiments of the invention are directed to catalyst compositions and catalytic articles including molecular sieves, exhaust gas systems, and methods of abating pollutants from exhaust gases using such catalytic articles. The catalytic articles are effective to destroy HC, CO and $NO_x$ from internal combustion engines. Specific embodiments are directed to catalyst compositions and catalytic articles and systems for the treatment of exhaust gas from lean burn engines as described above. The catalyst composition comprises a platinum group metal supported on a refractory metal oxide support and further comprises porous molecular sieve particles wherein greater than 90% of the molecular sieve particles have a particle size greater than 1 µm. In some embodiments, the molecular sieve particle size has a $d_{50}$ less than 80 microns. In one or more embodiments the molecular sieve particles have a $d_{50}$ less than 80, 70, 60, 55, 50, 45, 40, 35, 30, 25, 20, 15, or 10 microns. In specific embodiments, the molecular sieve particle size has a $d_{50}$ less than 50 microns. In specific embodiments, greater than 95% of the molecular sieve particles have a particle size greater than 1 µm, and in more specific embodiments, greater than 96% of the molecular sieve particles have a particle size greater than 1 µm, and in even more specific embodiments, the molecular sieve particle component comprises about 96% particles greater than 1 µm and about 85% of particles greater than 2 µm, and in highly specific embodiments, the molecular sieve particle component comprises about 96% particles within 5 µm of the mean particle size and the mean particle size is greater than about 5 µm. In one or more embodiments, the molecular sieve particle component comprises 96% particles in the range of about 1 µm to 10 µm. According to one or more embodiments, the mean particle size of the molecular sieve component is greater than about 15 µm and about 90% of the molecular sieve particles are within 15 µm of the mean particle size.

According to one or more embodiments, a portion of the platinum group metal is supported on the molecular sieve particles. In one or more embodiments, the PGM is not intentionally dispersed on the molecular sieve particles; however, as will be understood by the skilled artisan, during processing of slurries to form washcoats to be applied to substrates during the manufacture of a catalytic article, some amount of PGM will be supported on the molecular sieve particles.

According to one or more embodiments, the molecular sieve does not include a surface coating. In one or more embodiments, substantially all the molecular sieve particles comprise primary crystallites with sizes greater than 1 µm. In specific embodiments, substantially all the molecular sieve particles comprise agglomerates of primary crystals larger than 1 µm which maintain physical integrity and remain agglomerated during normal diesel oxidation catalyst slurry preparation. "Substantially all" means greater than 98% by weight. In specific embodiments, a binder holds the crystallites together. Suitable binders include alumina, silica, ceria, zirconia, phosphate, and combinations thereof. Organic binders are also possible since they can hold the zeolite agglomerates together during slurry preparation until final calcination of the coated part is accomplished.

A preferred technique for agglomerating particles and crystallites includes spray drying with a binder at a level high enough to maintain structural integrity of the spray dried particle but not so high as to block zeolite pores and reduce hydrocarbon adsorption performance. Suitable binders include silica, alumina, ceria, zirconia, and phosphate. Organic binder materials are also possible. Although different techniques and equipment exist for spray drying materials on both lab and commercial scales, the scope of this invention is not limited to a particular design or process. One feature is that a slurry of zeolite mixed with binder is atomized to a fine spray and subsequently flash dried at high temperature to generate agglomerated particles of the desired particle size range. Depending on the binder used, the spray dried zeolite may optionally be calcined at higher temperature to fix the binder. Other suitable agglomeration techniques include tumbling or mixing the zeolite particles with a wax or other binder type material.

Each of the sizes/ranges described herein may be referred to as "large particle size molecular sieve particles." The large particle size of the molecular sieve particles prevents negative interaction with the platinum group metal.

Embodiments of the invention are directed to eliminating the negative interaction between the molecular sieve and the platinum group metal oxidation catalyst when combined in the same coating layer by use of a molecular sieve with a large particle size as described above. This includes either individual crystallites that are larger than 1 um or clusters of smaller crystallites that are larger than 1 um. However, the clusters or agglomerates must have sufficient structural integrity to remain agglomerated (i.e. remain >1 um) during normal slurry preparation and coating processes.

Specific embodiments are directed to the use of large particle size molecular sieves for improved performance when combined with platinum group metals supported on refractory oxide support particles in the manufacture of DOC, CSF or LNT catalytic articles. In a specific embodiment, platinum and palladium are supported on an alumina support ("Pt/Pd/alumina"). More specifically, embodiments of the invention are directed to the use of molecular sieves wherein the large particle size of the molecular sieve prevents negative interaction of the molecular sieve with components contained in slurry used to prepare washcoated Pt/Pd/alumina DOC or LNT catalyst.

The molecular sieve can be comprised of primary crystallites (i.e. the smallest building block that cannot be reduced in size by physical means such as milling) with sizes larger than 1 um or agglomerates of primary crystallites larger than 1 um as long as the agglomerates maintain their physical integrity and remain agglomerated during normal catalyst slurry preparation and coating.

Specific embodiments of the invention are directed to eliminating the negative interaction between Beta zeolite and Pt/Pd DOC catalyst when combined in the same coating layer by use of Beta zeolite with particle size greater than 1 um. This includes either individual crystallites that are larger than 1 um or clusters of smaller crystallites that are larger than 1 um. However, the agglomerates must have sufficient structural integrity to remain agglomerated (i.e. remain >1 um) during normal slurry preparation and coating processes.

According to one or more embodiments, the light-off CO temperature of the catalyst Composition after aging at 750 C is 5° C. less than the light off temperature of a catalyst composition comprising molecular sieve particles and a platinum group metal supported on a refractory metal oxide support having greater than 10% by weight of molecular sieve particles sized less than 1 µm.

Thus, according to embodiments of the invention, the negative interaction between the molecular sieve and the platinum group metal is eliminated when the molecular sieve and platinum group metal are combined in the same coating layer by use of large particle size molecular sieve that does not negatively interact with soluble components contained in slurry used to prepare washcoated platinum group metal DOC or LNT catalyst.

Identification of zeolite particles dispersed within a coated catalyst composition is readily accomplished using various microscopy, chemical and image analysis techniques known to those skilled in the art. For example, cross sections of coated articles (e.g. coated monoliths) can be imaged by SEM (scanning electron microscopy) at the appropriate magnification to reveal zeolite particles dispersed within the refractory oxide supported precious metal coating. Composition of the individual zeolite particles can be confirmed by spot analysis techniques such as EDS (Energy Dispersive Spectroscopy) or by well-known bulk analysis techniques such as XRD (X-ray Diffraction). If the zeolite particles are sufficiently large, quantification of their size and number can be accomplished by straightforward measurement and counting. However, to simplify this process, particularly if the particles are smaller, sophisticated image analysis computer software programs can be utilized to calculate the number distribution of zeolite particles within the coating at different particle sizes. While these are just a few of the techniques that can be used to quantify the particle size distribution of zeolite within a catalyst washcoat, other techniques known in the art but not described here may be equally appropriate and can be utilized as needed.

Although specific embodiments of the invention are directed to the use of Beta zeolite, the concept is also valid for other zeolite or micro-porous crystalline solid compositions, particularly those with large pore openings (e.g. ZSM-12, SAPO-37, etc.). Thus any molecular sieve material having a large particle size is within the scope of the present invention.

With respect to the terms used in this disclosure, the following definitions are provided.

As used herein, molecular sieves refer to materials based on an extensive three-dimensional network of oxygen ions containing generally tetrahedral type sites and having a pore distribution. A zeolite is a specific example of a molecular sieve, further including silicon and aluminum. Reference to a "non-zeolite-support" or "non-zeolitic support" in a catalyst layer refers to a material that is not a molecular sieve or zeolite and that receives platinum group metals, stabilizers, promoters, binders, and the like through association, dispersion, impregnation, or other suitable methods. Examples of such non-zeolitic supports include, but are not limited to, high surface area refractory metal oxides. High surface area refractory metal oxide supports can comprise an activated compound selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, ceria-alumina, ceria-silica-alumina, zirconia-silica, titania-silica, and zirconia-titania.

Another aspect of the invention pertains to catalytic articles. The catalytic article comprises a carrier substrate having a length, an inlet end and an outlet end, an oxidation catalyst material on the carrier, the oxidation catalyst material including an oxidation catalyst composition as described above. Typically the composition is in the form of washcoat.

As used herein, the term "catalyst" refers to a material that promotes a reaction. As used herein, the phrase "catalyst composition" refers to a combination of two or more materials that promote a reaction, for example, a platinum group metal on a support and a zeolite in combination.

As used herein, the term "carrier" refers to a support that carries or supports a catalytic species. For example, refractory metal oxide particles may be a carrier for platinum group metal catalytic species.

As used herein, the term "substrate" refers to the monolithic material onto which the carrier is placed, typically in the form of a washcoat containing a plurality of carriers having catalytic species thereon. A washcoat is formed by preparing a slurry containing a specified solids content (e.g., 20-60% by weight) of carriers in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. Washcoats are disposed on substrate by applying a slurry, which is mixture of solid particles and a liquid vehicle (typically an aqueous vehicle), to the substrate to form the washcoat. Once applied, the washcoat is typically dried and optionally calcined.

"Catalytic article" refers to an element in an exhaust gas treatment system that is used to promote a desired reaction. For example, a catalytic article may comprise a washcoat containing catalytic species on a substrate.

In one or more embodiments, the substrate is a ceramic or metal having a honeycomb structure. Any suitable substrate may be employed, such as a monolithic substrate of the type having fine, parallel gas flow passages extending there through from an inlet to an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The ceramic substrate may be made of any suitable refractory material, e.g. cordierite, cordierite-$\alpha$-alumina, silicon carbide, silicon nitride, zircon mullite, spodumene, alumina-silica-magnesia, zircon silicate, sillimanite, a magnesium silicate, zircon, petalite, $\alpha$-alumina, an aluminosilicate and the like.

The substrates useful for the catalyst carriers of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

"Rich gaseous streams" including rich exhaust streams mean gas streams that have a $\lambda<1.0$.

"Rich periods" refer to periods of exhaust treatment where the exhaust gas composition is rich, i.e., has a $\lambda<1.0$.

"Rare earth metal components" refer to one or more oxides of the lanthanum series defined in the Periodic Table of Elements, including lanthanum, cerium, praseodymium and neodymium. Rare earth metal components can include at least one rare earth metal selected from Ce, Pr, Nd, Eu, Nb, Sm, Yb, and La.

"Alkaline earth component" refers to one or more chemical elements defined in the Periodic Table of Elements, including beryllium (Be), magnesium (Mg), calcium (Ca), strontium (Sr), barium (Ba), and radium (Ra).

"Alkali metal component" refers to one or more chemical elements defined in the Periodic Table of Elements, including lithium (Li), sodium (Na), potassium (K), rubidium (Rb), cesium (Cs), and francium (Fr).

The catalytic articles described herein may be used as part of an exhaust gas treatment system. Thus, if the large particle size molecular sieves are used as part of a LNT, a DOC or integrated LNTDOC catalytic article, the catalytic article can be used in an integrated emission treatment system comprising one or more additional components for the treatment of diesel exhaust gas emissions. For example, the emission treatment system may further comprise a soot filter component. The soot filter may be catalyzed for specific functions. If the catalytic article is a DOC, the filter is typically located downstream from the filter. The LNT catalytic article may be located upstream or downstream from the filter.

In a specific embodiment, the soot filter is a catalyzed soot filter (CSF). The CSF can comprise a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., alumina, silica, silica alumina, zirconia, and zirconia alumina) and/or an oxidation catalyst (e.g., a ceria-zirconia) for the combustion of unburned hydrocarbons and to some degree particulate matter. However, preferably the soot burning catalyst is an oxidation catalyst comprising one or more platinum group metal (PGM) catalysts (platinum, palladium, and/or rhodium). In one or more embodiments, the large particle molecular sieves are used to form a CSF where a PGM is utilized.

In general, any known filter substrate in the art can be used, including, e.g., a honeycomb wall flow filter, wound or packed fiber filter, open-cell foam, sintered metal filter, etc., with wall flow filters being specifically exemplified. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Specific wall flow substrates have a wall thickness of between 0.002 and 0.015 inches.

The porous wall flow filter used in embodiments of the invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

It will be appreciated that an LNT will include components in addition to the platinum group metal on a refractor oxide particle and a molecular sieve. Typically, an LNT will further comprise ceria particles having an alkaline earth such as barium supported on the cerium oxide.

Another aspect of the invention pertains to a method of making a catalytic article for the treatment of exhaust gas from an internal combustion engine containing hydrocarbons, carbon monoxide and nitrogen oxides. In an embodiment, the method includes forming a slurry comprising platinum group metal or metals supported on a refractory metal oxide support and molecular sieve particles, wherein greater than 90% of the molecular sieve particles have a particle size greater than 1 μm.

Still other embodiments of the invention pertain to methods of treating exhaust gas from internal combustion engines comprising flowing the exhaust gas from an internal combustion engine over the catalytic article described herein. In specific embodiments, the internal combustion engine is a lean burn engine as defined above.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

EXAMPLES

The following non-limiting examples demonstrate the principles of embodiments of the present invention based on an exemplary molecular sieve material, Beta zeolite.

Example 1

Preparation of Comparative Catalyst A

A high surface area gamma alumina having a BET surface area of approximately 150 $m^2$/g, a pore volume of approximately 0.85 cc/g, and an average pore radius of approximately 100 Å was impregnated with palladium nitrate solution using standard incipient wetness techniques. After adding additional DI water to form a thick paste, Pt "A" solution was added. After diluting further with DI water and reducing the pH to 4 with addition of nitric acid, the resulting slurry was milled to a particle size 90% less than ca. 20 um using methods known in the art. High silica to alumina ratio Beta zeolite obtained from a commercial supplier (Zeolite A) was then dispersed into the mixture. The final slurry was coated onto a 1" diameter by 3" long cordierite substrate using deposition methods also known in the art. The coated monolith was dried at 120° C. and calcined at 450° C. in air for 1 h. Total washcoat loading after calcination was approximately 2.0 g/$in^3$ with the beta zeolite comprising 0.5 g/$in^3$. Total platinum group metal loading was 80 g/$ft^3$ with a Pt/Pd weight ratio of 2:1.

Example 2

Preparation of Catalyst B

Figure 1:
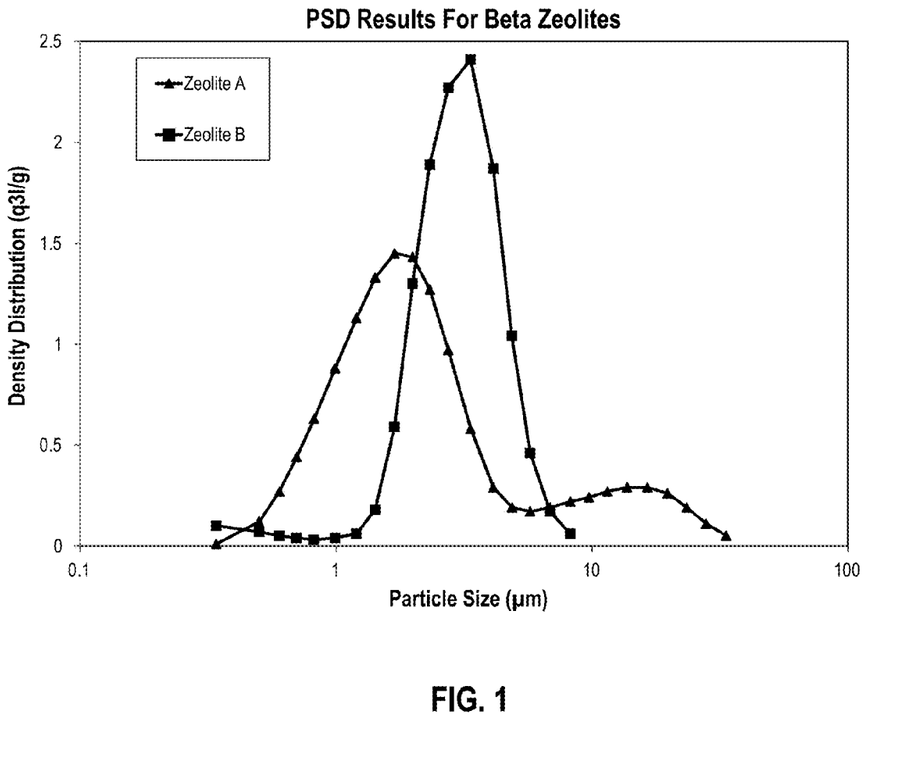
FIG. 1 shows the particle size distribution according to inventive examples and a comparative example.

Catalyst B was prepared identically to Catalyst A except that a high silica to alumina Beta zeolite obtained from the same supplier of nominally the same composition as Zeolite A but with different particle size distribution was used (Zeolite B). For Zeolite A, particle size measurement by laser light scattering technique (Sympatec Quixel Model HD23) in dilute aqueous slurry showed the following distribution of particles: 14%<1 um and 52%<2 um (d50=2 um). In contrast, Zeolite B had the following distribution of particles: 4%<1 um and 15%<2 um (d50=5 um). Clearly, Zeolite A had a much larger fraction of small particles less than 2 um, and in fact, had significantly more submicron particles (see FIG. 1).

Figure 2:
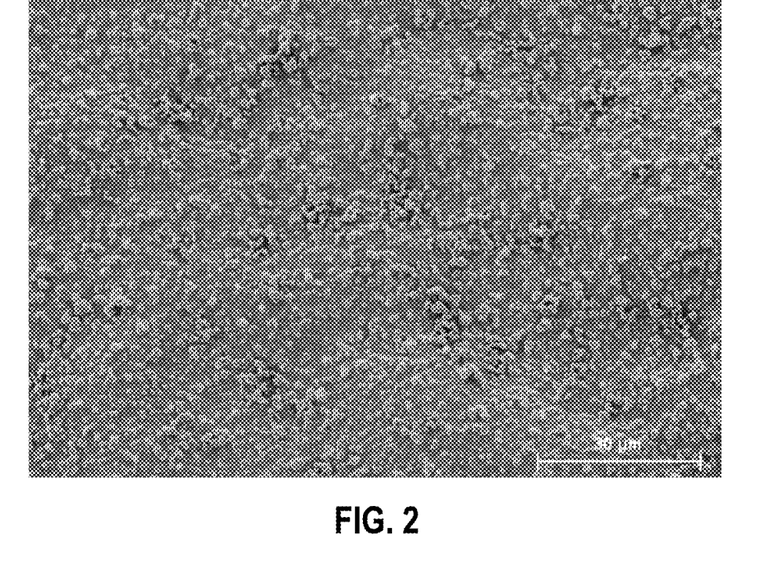
FIG. 2 is an SEM photograph of the zeolite used in the preparation of Comparative Catalyst A.
Figure 3:
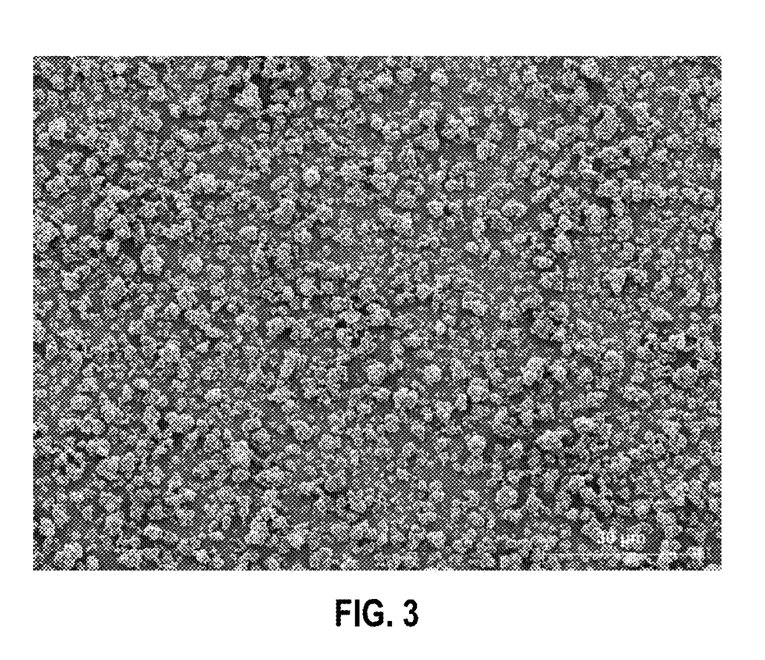
FIG. 3 is an SEM photograph of the zeolite used in the preparation of Catalyst B.

Comparative SEM photos showing the difference in particle size of zeolite powders A and B are shown in FIGS. 2 and 3.

Example 3

Preparation of Catalyst C

Figure 4:
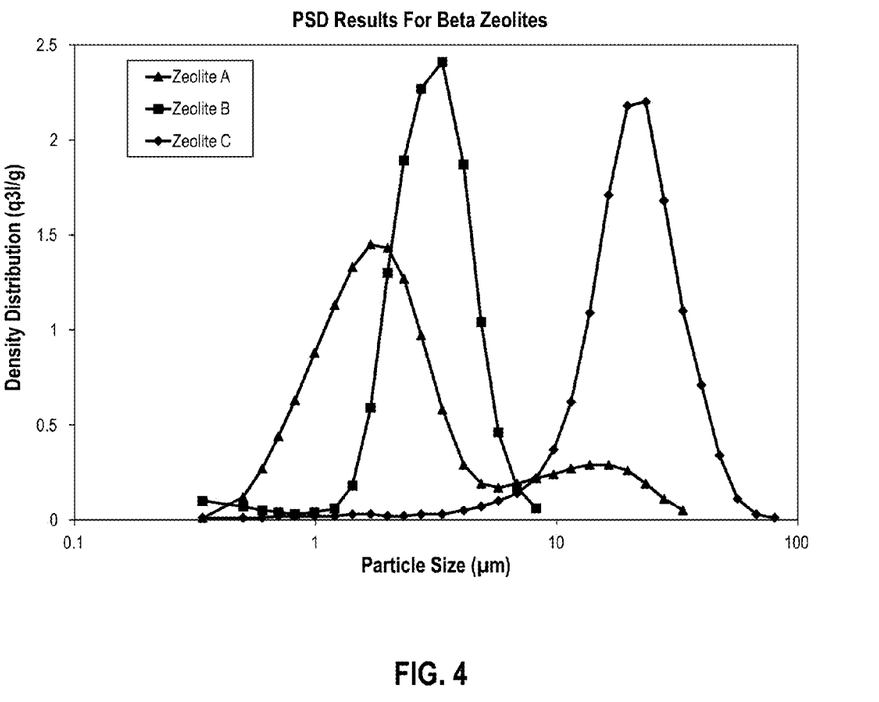
FIG. 4 is a graph of the particle size analysis of Catalysts A, B, and C.
Figure 5:
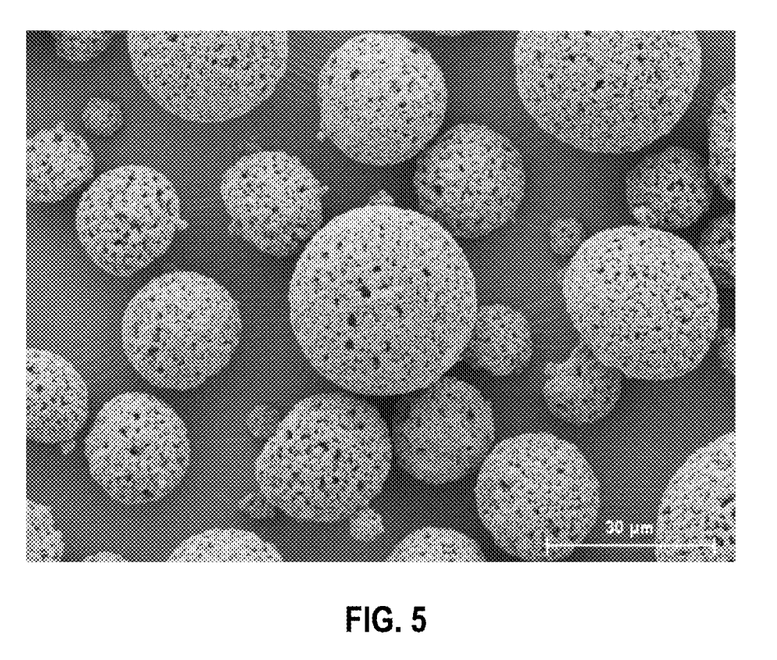
FIG. 5 is an SEM photograph of the zeolite used in the preparation of Catalyst C.

Catalyst C was prepared identically to Catalyst A using the same high silica to alumina ratio Beta zeolite (Zeolite A) but after agglomeration by spray drying to much larger particle size using 10% ceria binder (Zeolite C). For Zeolite C, particle size measurement by laser light scattering technique (Sympatec Quixel Model HD23) in dilute aqueous slurry showed the following distribution of particles: 0.7%<1 um, 1.5%<2 um, 4.1%<5 um, and 10%<11 um (d50=22 um). A summary particle size distribution plot for Zeolites A, B, and C is shown in FIG. 4. Compared to Zeolites A and B, the particle size of Zeolite C is much larger. An SEM photo showing the large particle size of spray dried zeolite powder C is shown in FIG. 5.

Example 4

Preparation of Catalyst D

Figure 6:
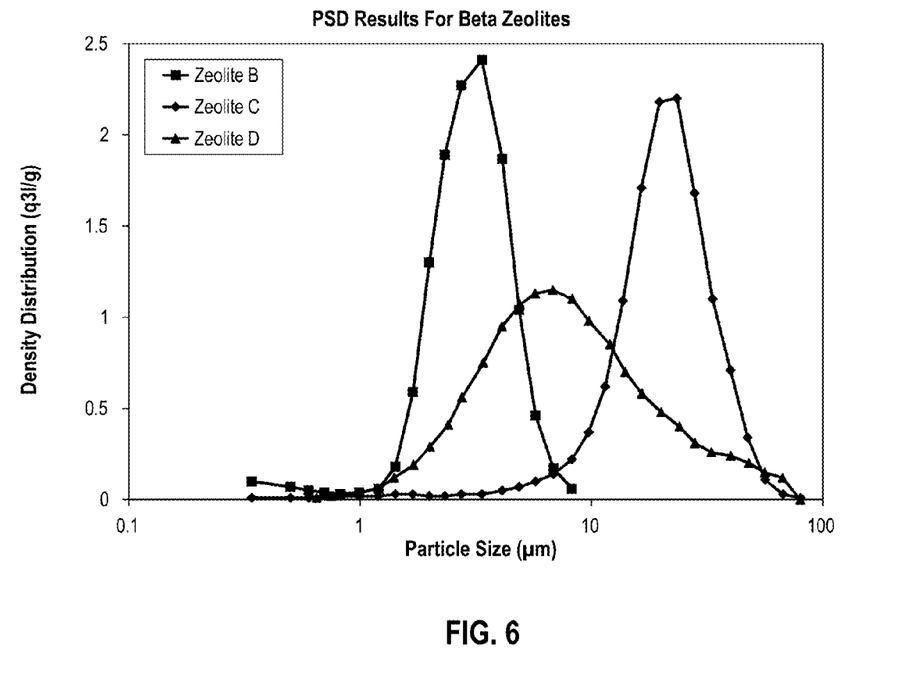
FIG. 6 is a graph of the particle size analysis of Catalysts B, C, and D.

Catalyst D was prepared identically to Catalyst A except that a different high silica to alumina ratio Beta zeolite (Zeolite D) was used that had a particle size distribution between that of Zeolites B and C. For Zeolite D, particle size measurement by laser light scattering technique (Sympatec Quixel Model HD23) in dilute aqueous slurry showed the following distribution of particles: 0.5%<1 um, 12%<3 um, and 27%<4.5 um (d50=7 um). A summary particle size distribution plot for Zeolites B, C, and D is shown in FIG. 6. Zeolite D has a larger particle size distribution than that of Zeolite B, but is smaller than that of Zeolite C.

Example 5

SEM Imaging of Washcoated Catalysts A, C, and D

Figure 7:
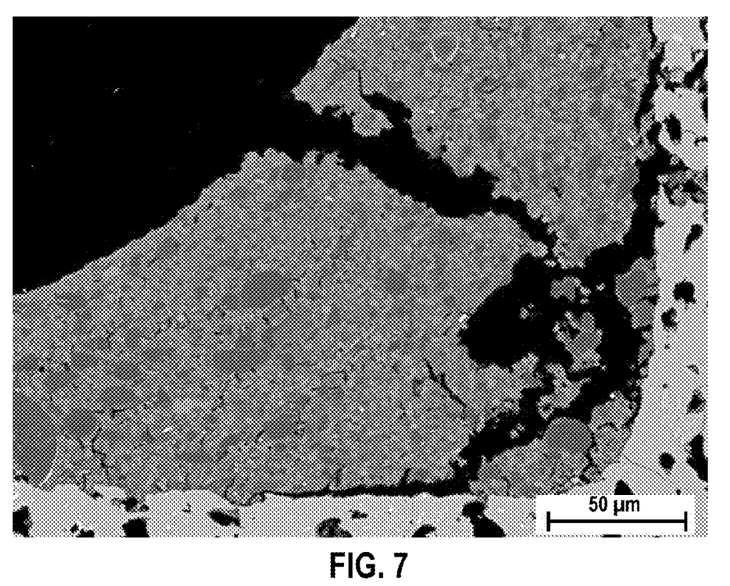
FIG. 7 is an SEM photograph of washcoat from Comparative Catalyst A.
Figure 8:
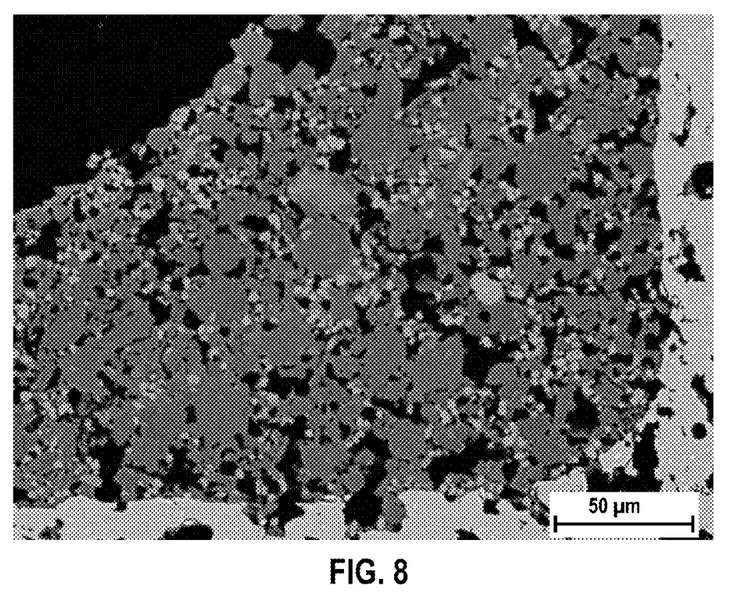
FIG. 8 is an SEM photograph of washcoat from Catalyst D.
Figure 9:
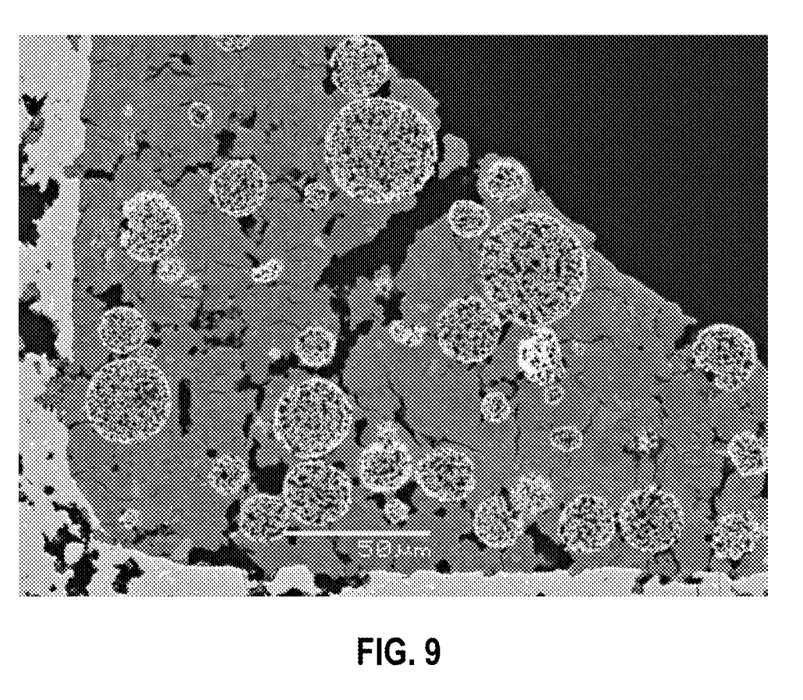
FIG. 9 is an SEM photograph of washcoat from Catalyst C.

SEM images were obtained of washcoated catalysts A, C, and D (FIGS. 7-9). Coated cores were mounted in epoxy and then cut perpendicular to the direction of gas flow through the monolith to reveal the washcoated channels in cross section. For Comparative Catalyst A which used zeolite with a large fraction of particles smaller than 1 um, it is difficult to identify individual zeolite particles in the washcoat (FIG. 7). However, for Catalyst D and especially Catalyst C which used the spray dried zeolite, zeolite particles are clearly visible (FIGS. 8 and 9).

Example 6

Preparation of Comparative Catalyst E

Catalyst E was prepared by a process similar to that described in Example 1 except that two different slurries were used to coat the catalyst in two different layers. The slurry used to coat the bottom layer contained only Pt, Pd, and alumina while the slurry used to coat the top layer contained Pt, Pd, alumina and Zeolite A, the same small particle size zeolite used to prepare Catalyst A. The platinum group metal loading in the bottom layer was 53 g/ft$^3$ at a Pt/Pd weight ratio of 2:1. The same 2:1 Pt/Pd weight ratio was used in the top layer with the zeolite but at a lower loading of 27 g/ft$^3$. Total platinum group metal loading was 80 g/ft$^3$ with a Pt/Pd weight ratio of 2:1. Total washcoat loading after calcination was approximately 2.6 g/in$^3$ with the beta zeolite in the top layer comprising 0.5 g/in$^3$ Example 7

Preparation of Catalyst F

Catalyst F was prepared identically to Catalyst E except that spray dried Zeolite C was used instead of Zeolite A.

Example 8

Catalyst Aging and Testing

The coated Pt/Pd catalyst monolith compositions prepared in Examples 1 through 7 were tested as follows. First, the coated monoliths were aged in a diesel engine exhaust stream at 750° C. for 25 hours. The temperature of the exhaust steam was raised to 750° C. by combusting injected diesel fuel on an upstream burner DOC. After aging, the coated monoliths were evaluated for light-off (LO) of carbon monoxide (CO) using a laboratory reactor system capable of passing simulated diesel engine exhaust over a small sample while progressively increasing the temperature. The gas stream composition comprised 1600 ppm CO, 550 ppm total hydrocarbon on a C1 basis (250 ppm propylene, 150 ppm decane, and 150 ppm toluene), 10% $O_2$, 100 ppm NO, 4.5% $CO_2$, 4% $H_2O$, and balance nitrogen. The test samples were equilibrated for 2-3 minutes under the flowing gas at 100° C. prior to ramping to 315° C. at a ramp rate of 15° C./min. The total gas flow space velocity was 70,000 h$^{-1}$. Catalyst outlet CO concentration was measured using a Fourier Transform Infrared (FTIR) analyzer and CO conversion was calculated as a function of temperature. The temperatures at which 50% conversion of CO occurred are summarized in Table 1 for Catalysts A-F. After 750° C. engine aging, the CO LO temperature for reference single layer Comparative Catalyst A which used small particle size Zeolite A was 6-9° C. higher than Catalysts B, C, and D, all of which used zeolite with larger particle size. Similarly, the CO LO temperature for reference double layer Comparative Catalyst E which also used small particle size Zeolite A was 4° C. higher than Catalyst F which used spray dried Zeolite C. Clearly, use of Beta zeolite with smaller particle size resulted in significantly higher CO LO temperature and worse performance.

TABLE 1

| CO Light-Off Temperatures (T50) for Pt/Pd Catalysts (° C.) | |
| --- | --- |
| Catalyst A (Comparative) | 168 |
| Catalyst B | 162 |
| Catalyst C | 160 |
| Catalyst D | 159 |
| Catalyst E (Comparative) | 162 |
| Catalyst F | 158 |

Example 9

Catalyst Evaluation Using Lab Reactor that Simulates Vehicle New European Drive Cycle (NEDC)

Catalysts A, C, E, and F were also evaluated for CO and HC conversion performance on a lab reactor designed to simulate the transient behavior of a vehicle. More specifically, the reactor was designed to simulate the exhaust gas flows, emissions, and temperatures of a diesel vehicle when operating under a specified certification drive cycle. Table 2 summarizes CO and HC emissions for the respective catalysts when tested using the New Emission Drive Cycle (NEDC). The average NEDC exhaust temperature for this test was 163° C. while total CO and HC emissions were 1.03 g/km/L-cat and 0.27 g/km/L-cat, respectively. After 750° C. engine aging, the CO and HC conversion for single layer Catalyst C prepared with the spray dried (large particle size) Zeolite C was at least 5% higher than that of Comparative Catalyst A prepared with small particle size Zeolite A. Similarly, CO and HC conversion for double layer Catalyst F containing Zeolite C was 4% higher than Comparative Catalyst E prepared with Zeolite A. Clearly, use of Beta zeolite with larger particle size resulted in significantly higher catalyst performance.

TABLE 2

CO & HC Conversion for Pt/Pd Catalysts After NEDC Evaluation on Lab Reactor

|  | CO Conversion (%) | HC Conversion (%) |
|---|---|---|
| Catalyst A (Comparative) | 63 | 69 |
| Catalyst C | 70 | 74 |
| Catalyst E (Comparative) | 70 | 74 |
| Catalyst F | 74 | 78 |

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. A catalyst composition comprising a washcoat including a platinum group metal supported on a refractory metal oxide support and further comprising molecular sieve particles, wherein greater than 90% of the molecular sieve particles have a particle size greater than 1 μm and a $d_{50}$ less than 50 microns, wherein the molecular sieve does not have a surface coating.

2. The catalyst composition of claim 1, wherein a portion of the platinum group metal is supported on the molecular sieve particles.

3. The catalyst composition of claim 1, wherein greater than 95% of the molecular sieve particles have a particle size greater than 1 μm.

4. The catalyst composition of claim 1, wherein greater than 96% of the molecular sieve particles have a particle size greater than 1 μm.

5. The catalyst composition of claim 1, wherein the molecular sieve particles are spray-dried particles mixed with binder.

6. The catalyst composition of claim 1, wherein the platinum group metal comprises platinum and palladium.

7. The catalyst composition of claim 1, wherein greater than 90% of the molecular sieve particles comprise primary crystals with sizes greater than 1 μm.

8. The catalyst composition of claim 1, wherein the molecular sieve particles are agglomerates of primary crystals that maintain physical integrity and remain agglomerated during normal oxidation catalyst slurry preparation.

9. The catalyst composition of claim 8, further comprising a binder holding the crystals together.

10. The catalyst composition of claim 1 wherein the molecular sieve particle component comprises about 96% particles greater than 1 μm and about 95% of particles greater than 2 μm.

11. The catalyst composition of claim 1 wherein the molecular sieve particle component comprises 96% particles in the range of about 1 μm to 10 μm.

12. The catalyst composition of claim 1, wherein the molecular sieve particles are zeolites selected from the group consisting of faujasite, chabazite, clinoptilolite, mordenite, silicalite, zeolite X, zeolite Y, ultrastable zeolite Y, ZSM-5, ZSM-12, SSZ-13, SAPO-5, SAPO-37, offretite, Beta zeolite and combinations thereof.

13. The catalyst composition according to claim 12, wherein the zeolite is H-Beta.

14. The catalyst composition of claim 1, wherein the zeolite has a particle size distribution that is monomodal.

15. A catalytic article for the treatment of exhaust gas from a lean burn internal combustion engine containing hydrocarbons, carbon monoxide and nitrogen oxides comprising a carrier substrate having a length, an inlet end and an outlet end, an oxidation catalyst material on the carrier, the oxidation catalyst material including the catalyst composition of claim 1.

16. The catalytic article of claim 15, wherein the catalytic article utilizes a single washcoat layer.

17. A method of treating exhaust gas from a lean burn engine containing hydrocarbons, carbon monoxide and nitrogen oxides comprising flowing the exhaust gas over a catalytic article in accordance with claim 15.

18. A catalyst composition comprising a washcoat including a platinum group metal supported on a refractory metal oxide support and further comprising molecular sieve particles, wherein greater than 90% of the molecular sieve particles have a particle size greater than 1 μm and a $d_{50}$ less than 50 microns, and further comprising a binder selected from the group consisting of silica, ceria, phosphate, combinations of silica, ceria and phosphate, and an organic binder.

19. The catalyst composition of claim 18, wherein greater than 95% of the molecular sieve particles have a particle size greater than 1 μm.

20. The catalyst composition of claim 18, wherein greater than 96% of the molecular sieve particles have a particle size greater than 1 μm.

21. The catalyst composition of claim 18, wherein the platinum group metal comprises platinum and palladium.

22. The catalyst composition of claim 18, wherein the molecular sieve particles are agglomerates of primary crystals that maintain physical integrity and remain agglomerated during normal oxidation catalyst slurry preparation.

23. The catalyst composition of claim 18 wherein the molecular sieve particle component comprises about 96% particles greater than 1 μm and about 95% of particles greater than 2 μm.

24. The catalyst composition of claim 18 wherein the molecular sieve particle component comprises 96% particles in the range of about 1 μm to 10 μm.

25. The catalyst composition of claim 18, wherein the molecular sieve particles are zeolites selected from the group consisting of faujasite, chabazite, clinoptilolite, mordenite, silicalite, zeolite X, zeolite Y, ultrastable zeolite Y, ZSM-5, ZSM-12, SSZ-13, SAPO-5, SAPO-37, offretite, Beta zeolite and combinations thereof.

26. The catalyst composition according to claim 25, wherein the zeolite is H-Beta.

27. The catalyst composition of claim 18, wherein the zeolite has a particle size distribution that is monomodal.

28. A catalytic article for the treatment of exhaust gas from a lean burn internal combustion engine containing hydrocarbons, carbon monoxide and nitrogen oxides comprising a carrier substrate having a length, an inlet end and an outlet end, an oxidation catalyst material on the carrier, the oxidation catalyst material including the catalyst composition of claim 18, wherein the article is a DOC.

29. A catalytic article for the treatment of exhaust gas from a lean burn internal combustion engine containing hydrocarbons, carbon monoxide and nitrogen oxides comprising a carrier substrate having a length, an inlet end and an outlet end, an oxidation catalyst material on the carrier, the oxidation catalyst material including the catalyst composition of claim 18, wherein the article is a CSF.

30. A catalyst composition comprising a washcoat including a platinum group metal supported on a refractory metal oxide support and further comprising molecular sieve particles, wherein greater than 90% of the molecular sieve particles have a particle size greater than 1 μm and a $d_{50}$ less than 50 microns, and further comprising an alkaline earth metal component.

31. The catalyst composition of claim 30, wherein greater than 95% of the molecular sieve particles have a particle size greater than 1 μm.

32. The catalyst composition of claim 30, wherein greater than 96% of the molecular sieve particles have a particle size greater than 1 μm.

33. The catalyst composition of claim 30, wherein the platinum group metal comprises platinum and palladium.

34. The catalyst composition of claim 30, wherein the molecular sieve particles are agglomerates of primary crystals that maintain physical integrity and remain agglomerated during normal oxidation catalyst slurry preparation.

35. The catalyst composition of claim 30 wherein the molecular sieve particle component comprises about 96% particles greater than 1 μm and about 95% of particles greater than 2 μm.

36. The catalyst composition of claim 30 wherein the molecular sieve particle component comprises 96% particles in the range of about 1 μm to 10 μm.

37. The catalyst composition of claim 30, wherein the zeolite has a particle size distribution that is monomodal.

38. A catalytic article for the treatment of exhaust gas from a lean burn internal combustion engine containing hydrocarbons, carbon monoxide and nitrogen oxides comprising a carrier substrate having a length, an inlet end and an outlet end, an oxidation catalyst material on the carrier, the oxidation catalyst material including the washcoat catalyst composition of claim 30, wherein the article is an LNT.

39. A catalyst composition comprising a platinum group metal supported on a refractory metal oxide support and further comprising non-agglomerated molecular sieve particles having a $d_{50}$ less than 50 microns, wherein greater than 90% of the molecular sieve particles have a particle size greater than 1 μm.

40. The catalyst composition of claim 39, wherein greater than 95% of the molecular sieve particles have a particle size greater than 1 μm.

41. The catalyst composition of claim 39, wherein greater than 96% of the molecular sieve particles have a particle size greater than 1 μm.

42. The catalyst composition of claim 39, wherein the molecular sieve particles are zeolites selected from the group consisting of faujasite, chabazite, clinoptilolite, mordenite, silicalite, zeolite X, zeolite Y, ultrastable zeolite Y, ZSM-5, ZSM-12, SSZ-13, SAPO-5, SAPO-37, offretite, Beta zeolite and combinations thereof.

43. A catalyst composition comprising a platinum group metal supported on a refractory metal oxide support and further comprising agglomerated particles comprising molecular sieve particles and a binder, the agglomerated particles having a $d_{50}$ less than 50 microns and wherein greater than 90% of the molecular sieve particles comprise primary crystals with sizes greater than 1 μm.

44. The catalyst composition of claim 43, wherein greater than 95% of the molecular sieve particles have a particle size greater than 1 μm.

45. The catalyst composition of claim 43, wherein greater than 96% of the molecular sieve particles have a particle size greater than 1 μm.

* * * * *